(12) United States Patent
Brainard

(10) Patent No.: US 6,516,682 B2
(45) Date of Patent: Feb. 11, 2003

(54) ADJUSTABLE CONTROL LEVER

(75) Inventor: Jay Brainard, Lewiston, NY (US)

(73) Assignee: Jay Brake Enterprises, Lewistown, NY (US)

(*) Notice: Subject to any disclaimer, the term of this patent is extended or adjusted under 35 U.S.C. 154(b) by 0 days.

(21) Appl. No.: 09/838,333

(22) Filed: Apr. 19, 2001

(65) Prior Publication Data
US 2001/0022114 A1 Sep. 20, 2001

Related U.S. Application Data

(63) Continuation of application No. 09/164,701, filed on Oct. 1, 1998, now abandoned.

(51) Int. Cl.⁷ .............................. F16C 1/10; G05G 11/00
(52) U.S. Cl. ...................... 74/502.2; 74/489; 74/558.5
(58) Field of Search .......................... 74/502.2, 489, 74/525, 558.5; 192/35

(56) References Cited

U.S. PATENT DOCUMENTS

| | | | |
|---|---|---|---|
| 2,874,587 A | 2/1959 | Schmid | 74/489 |
| 3,856,123 A | 12/1974 | Kinsey | 192/3.62 |
| 3,948,361 A | 4/1976 | Carlson | 188/24 |
| 4,364,283 A | 12/1982 | Ricardo | 74/489 |
| 4,391,160 A | 7/1983 | Myers | 74/551.8 |
| 4,560,049 A | 12/1985 | Uchibaba et al. | 192/85 |
| 4,607,733 A * | 8/1986 | Dodge | 192/3 S |
| 4,611,500 A | 9/1986 | Nagano | 74/489 |
| 4,779,482 A | 10/1988 | Kawaguchi | 74/523 |
| 5,123,296 A | 6/1992 | Chang | 74/502.2 |
| D356,061 S | 3/1995 | Gelbein | D12/179 |
| 5,537,891 A | 7/1996 | Nagano et al. | 74/525 |
| 5,549,017 A | 8/1996 | Lin | 74/558.5 |
| 5,660,082 A | 8/1997 | Hsieh | 74/502.2 |
| D392,233 S | 3/1998 | Masui | D12/179 |
| 5,979,266 A | 11/1999 | Nagano | 74/502.2 |

FOREIGN PATENT DOCUMENTS

| EP | 0173513 | 3/1986 | 74/489 |

\* cited by examiner

Primary Examiner—Vinh T. Luong
(74) Attorney, Agent, or Firm—Williams, Morgan & Amerson

(57) ABSTRACT

A brake lever is adjustably positionable relative to a handlebar of a motorcycle. The lever includes a base, a lever, and an adjustment mechanism. The base is adapted to be pivotally coupled to a master cylinder coupled to the handlebar, and the lever is pivotally coupled to the base. The adjustment mechanism controllably positions the lever relative to the base to control spacing between the lever and the handlebar. The adjustment mechanism includes a cylinder and a pin. The cylinder is rotatable about a longitudinal axis, is coupled to one of the base and the lever, and has a first and second bore hole extending radially therein for first and second preselected distances, respectively. The pin is coupled to the other of the base and the lever, is substantially perpendicular to the longitudinal axis of the cylinder, and is alternately engageable with the first and second bore holes.

17 Claims, 4 Drawing Sheets

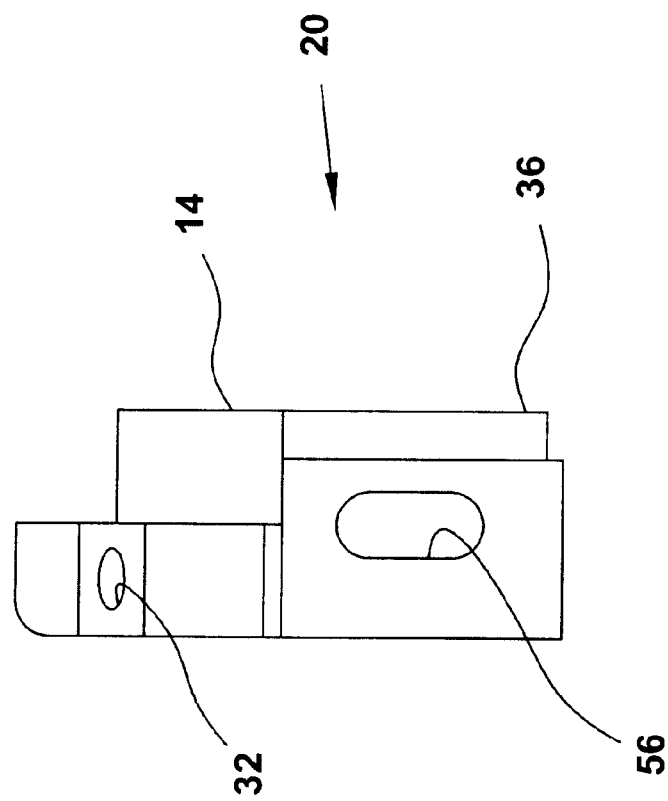
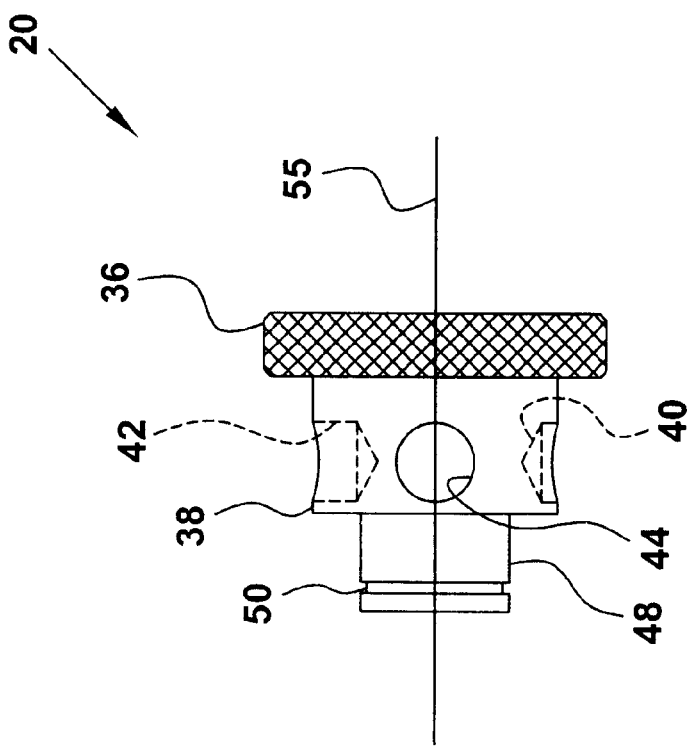
FIGURE 4
FIGURE 3

ADJUSTABLE CONTROL LEVER

This is a continuation of co-pending application Ser. No. 09/164,701 filed Oct. 1, 1998 now abandoned.

BACKGROUND OF THE INVENTION

1. Field of the Invention

This invention relates generally to a control lever, and, more particularly, to an adjustable clutch/brake lever for use on a motorcycle.

2. Description of the Related Art

Motorcycles have recently enjoyed a wide-ranging surge in popularity. Historically, motorcycles have had an exuberant following in a fairly narrow segment of society, but recently their ridership has been extended to a wide variety of individuals. Bankers, doctors, lawyers, and college professors now count themselves among motorcycle fans. Even gender lines have been crossed, as increasing numbers of women take up the sport. Motorcycles are rapidly moving into mainstream society.

Motorcycles have been designed with their historical audience in mind. That is, the physical dimensions of many popular motorcycles are designed to accommodate men of above average size. This "sizing" of the motorcycle has been a barrier to smaller individuals. In particular, women, and men with small hands, find it difficult, or at least tiring, to operate controls, such as brake and clutch hand-levers. That is, the spacing between the handgrip and the brake/clutch lever is sufficiently wide to comfortably accommodate a larger hand-span. Individuals with smaller hands must stretch beyond a comfortable position, and thus tend to tire after even moderate operation. Alternatively, "sizing" the motorcycle to a smaller-sized audience will leave many of today's larger riders with undersized motorcycles, which are equally difficult and tiring to operate.

Because of the efficiencies of manufacturing facilities, and the economies of scale, it is generally viewed as impractical to produce custom-sized motorcycles. That is, customizing the dimensions of each motorcycle produced would be cost prohibitive.

To alleviate these "sizing" problems, some manufacturers have attempted to design adjustable controls that accommodate a variety of rider sizes. These adjustable controls have been complex in design and construction, difficult to adjust, insufficiently rugged in design, and just plain ugly.

The present invention is directed to overcoming, or at least reducing the effects of, one or more of the problems set forth above.

SUMMARY OF THE INVENTION

In one aspect of the present invention, a control lever is provided. The control lever includes a base, a lever pivotally coupled to the base, and an adjustment mechanism for controllably positioning the lever relative to the base. The adjustment mechanism includes a cylinder and a pin. The cylinder is rotatable about a longitudinal axis and is coupled to one of the base and the lever and has a first and second bore hole extending radially thereon for first and second preselected distances. The pin is coupled to the other of the base and the lever and is substantially perpendicular to the longitudinal axis of the cylinder and alternately engageable with the first and second bore holes.

In another aspect of the present invention, a control lever is provided. The control lever includes a base, a lever pivotally coupled to the base, a spring and an adjustment mechanism. The spring extends between the base and the lever and urges the lever in a first direction toward a first operating position. The adjustment mechanism extends between the base and the lever and controllably positions the lever relative to the base. The adjustment mechanism is disengaged and free for adjustment in response to movement of the lever in a second direction opposite to the first direction.

BRIEF DESCRIPTION OF THE DRAWINGS

The invention may be understood by reference to the following description taken in conjunction with the accompanying drawings, in which like reference numerals identify like elements, and in which:

FIG. 3 illustrates a side view of a portion of an adjuster mechanism of FIGS. 1 and 2;

FIG. 4 illustrates an end view of the lever and adjuster mechanism of FIGS. 1–3.

Figure 1:
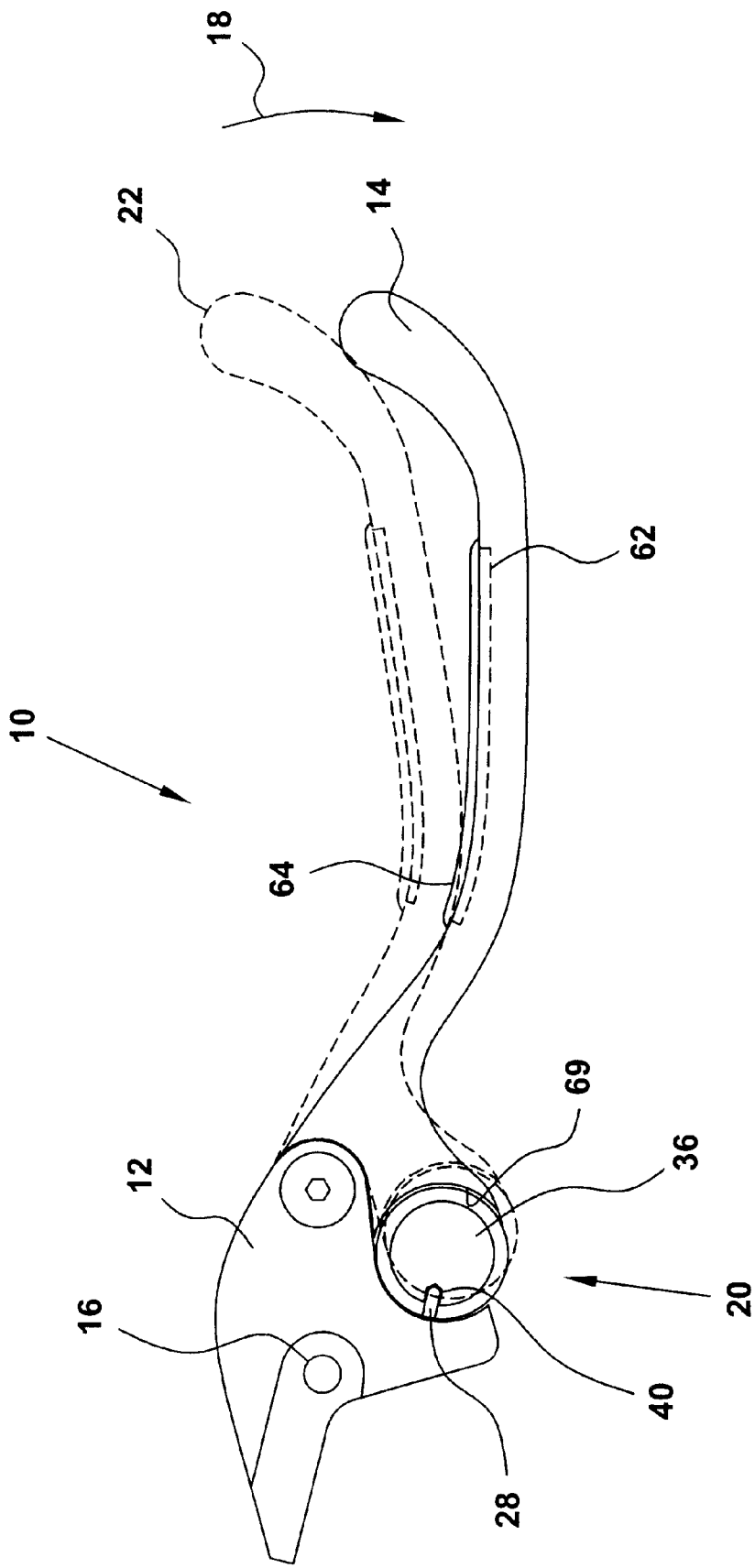
FIG. 1 illustrates a top view of an adjustable clutch/brake lever.

While the invention is susceptible to various modifications and alternative forms, specific embodiments have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and in particular, to FIG. 1, a top view of an adjustable clutch/brake mechanism 10 is shown. The mechanism 10 may be formed from a variety of materials, including aluminum, stainless steel, etc., and may be finished to any of a variety of appearances, such as chrome, black chrome, flat black, brushed aluminum, etc. The mechanism 10 includes a base 12 and a lever 14. The base 12 is coupled to, for example, a clutch/brake master cylinder (not shown) attached to a handlebar of a motorcycle (not shown). The connection of the base 12 to the master cylinder of the motorcycle is effected conventionally, such as by a nut and bolt arrangement (not shown) engaging a bore 16 extending through the base 12 and an attachment point (not shown) on the master cylinder (not shown). During normal operation, the base 12 and the lever 14 are pivotally moveable relative to the handlebar (not shown) in the direction indicated by an arrow 18. Movement of the lever 14 and base 12 in the direction indicated by the arrow 18 will effect operation of the system to which it is connected, such as a braking or clutch system.

An adjustment mechanism 20 is positioned between at least a portion of the lever 14 and base 12 to allow positioning of the lever 14 relative to the base 12 and the handlebar (not shown). That is, the adjustment mechanism 20 allows the lever 14 to be moved to a second operating position, such as that shown by the dashed lines 22. The second position 22 of the lever 14 provides an alternative spacing between the lever 14 and the handlebars (not shown) to accommodate riders of various hand size. It is envisioned that a plurality of positions may be accomplished by the adjustment mechanism 20 to accommodate a variety of riders.

Figure 2:
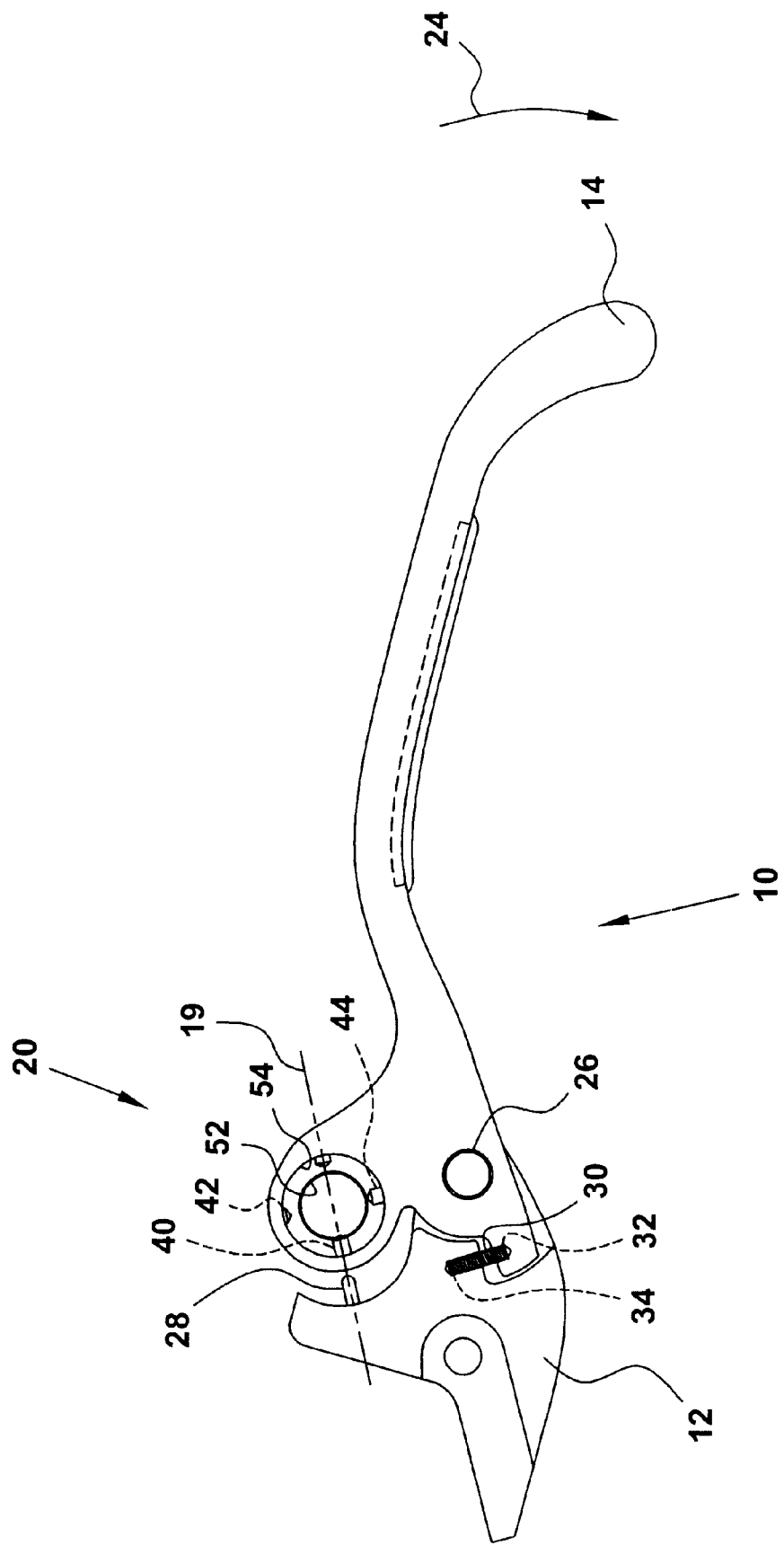
FIG. 2 illustrates a bottom view of the adjustable clutch/brake lever in a first operating position.

Operation of the adjustment mechanism 20 may be appreciated by reference to a bottom view of the mechanism 10, as shown in FIG. 2. In FIG. 2, the lever 14 is shown moved outwardly relative to the base 12 and handlebar (not shown), in a direction indicated by an arrow 24. Movement of the lever 14 in the direction indicated by the arrow 24 does not cause the base 12 to move, but rather causes movement of the lever 14 about o pivot point 26, such that the adjustment mechanism 20 is moved away form the base 12 and disengaged from a pin 28 fixedly extending form the base 12 along a center line 19 of the adjustment mechanism 20. Normally, the lever 14 is urged toward the position illustrated in FIG. 1 by a spring 30, such as a coil spring, extending between operating surfaces of the lever 14 and the base 12 and captured against lateral movement by bores 32, 34 extending into the base 12 and the lever 14, respectively.

With the lever 14 in the position illustrated in FIG. 2, operation of the adjustment mechanism 20 is readily accomplished by rotating a dial 36 (see FIG. 1) to one of a plurality of positions. The construction and operation of the dial 36 may be appreciated by reference to FIG. 3 where a side, partial hidden view is illustrated. The adjustment mechanism 20 includes a central, generally cylindrically-shaped body 38 having a plurality of bores 40, 42, 44 extending radially therein. A first end portion of the cylindrical body 38 is attached to the dial 36, and a second end portion of the body 38 is connected to a cylindrical body of reduced diameter 48. The reduced diameter cylindrical body 48 has an annular groove 50 formed therein and is adapted to receive a snap ring (not shown). The reduced diameter cylindrical body 48 extends through an opening 52 of like diameter in the lever 14 (see FIG. 2). A recessed bore 54 of larger diameter receives the snap ring (not shown) within the groove 50 of the reduced diameter cylindrical body 48 so as to capture the adjustment mechanism 20 within the lever 14, but allow rotational movement thereof, as effected by the dial 36.

The bores 40, 42, 44, extend radially toward the center line of the cylindrical body 38 and are of varying depths. That is, for example, the bore 42 may extend further into the cylindrical body 38 than the bore 44. The varying depths of the bores 40, 42, 44 provide for a variety of operating positions for the lever 14. That is, the pin 28 is substantially perpendicular to a longitudinal axis 55 of the adjustment mechanism 20 so that rotation of the dial 36 will variously align the bores 40, 42, 44 with the pin 28. Thus, when the lever 14 is released from the position shown in FIG. 2, the pin 28 will pass into one of the bores 40, 42, 44 and come rest against its bottom surface. The depths of the various bores 40, 42, 44 control the degree of movement of the lever 14, as caused by the spring 30, toward the base 12. That is, the deeper the bore 40, 42, 44, the further the lever 14 will move toward the base 12, reducing the spacing between the handlebar (not shown) and the lever 14. While three bores 40, 42, 44 have been illustrated, it is envisioned that more or fewer bores may be distributed about the periphery of the cylindrical body 48 without departing from the spirit and scope of the present invention.

As can be seen more clearly in FIG. 4, an end view of the lever 14 adjacent the adjustment mechanism 20 shows that a slot 56 extends through an end wall of the lever 14, intersecting with the opening 52 and generally aligned with the pin 28 so that it may pass through the lever 14 and into one of the bores 40, 42, 44 in the adjustment mechanism 20.

When the lever 14 is located in the position shown in FIG. 2, the adjustment mechanism 20 is free to rotate under very small forces. That is, with the lever 14 in the position illustrated in FIG. 2, very light thumb action may be used to rotate the dial 36 to adjust the positioning of the lever 14 to accommodate different hand sizes. The pin 28 serves a dual purpose of positioning the lever 14 at the desired operating position and locking the adjustment mechanism 20 against movement when in the operating position, as shown in FIG. 1.

It should be noted that the transfer of force from the lever 14 through the base 12 during normal operation of the mechanism 10 (as shown by the arrow 18 in FIG. 1) occurs through the pin 28 in the adjustment mechanism 20. The pin 28 will have the longest useful life if the forces are directed substantially along its longitudinal axis. Since the adjustment mechanism 20 is free for easy rotation, it is useful to locate the pin 28 perpendicular to its rotational axis so that operating pressure on the lever 14 does not cause the pin 28 to induce rotational movement of the adjustment mechanism 20. By locating the pin 28 substantially perpendicular to the rotational axis of the adjustment mechanism 20, rotational movement is minimized during normal operation.

Figure 5:
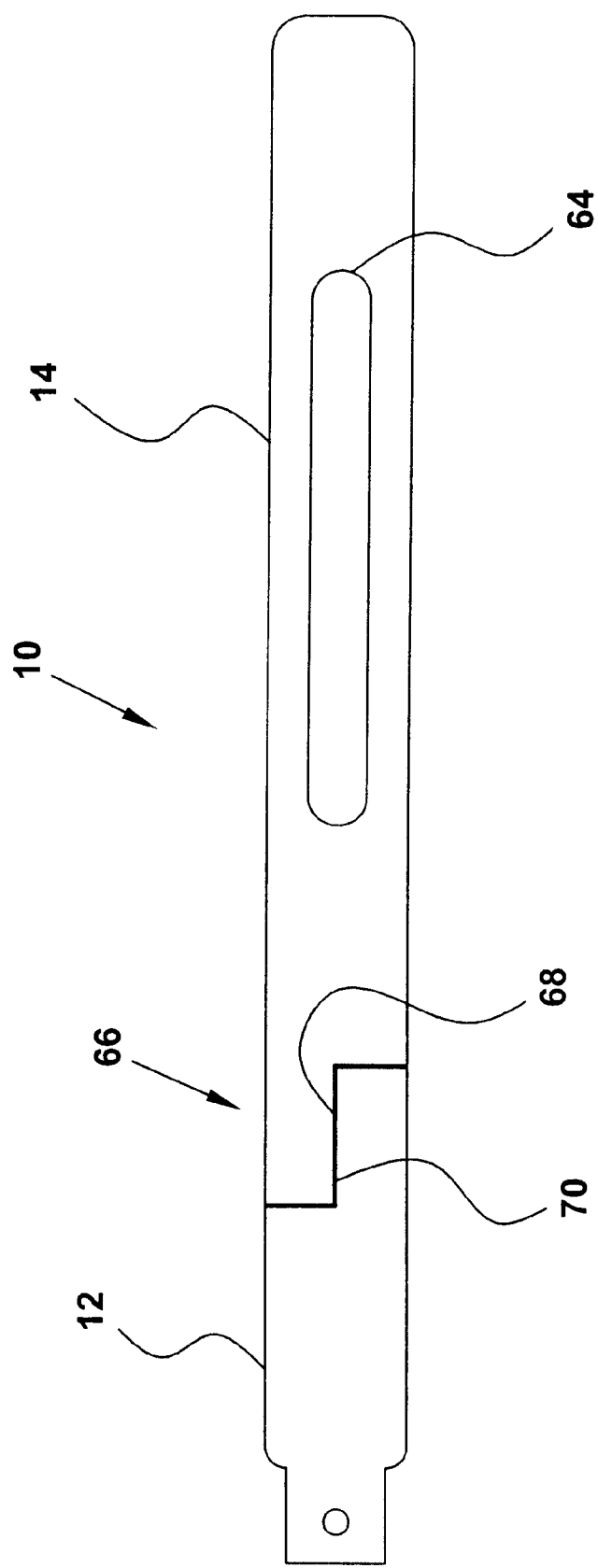
FIG. 5 illustrates a side view of the adjustable clutch/brake lever of FIGS. 1–4.

Referring now to FIGS. 1 and 5, a longitudinal recess 62 extending on a front side of the lever 14 is shown to receive a padded insert 64. The insert 64 may be constructed from a rubber material such as ethylene propylene diene terpolymers, and may have a durometer of about 60. The insert 64 may be retained in the recess 62 by either a friction fit or an adhesive, such as that manufactured under the trademark LOCTITE®. The insert 64 is located in the region of the lever 14 that is gripped by the fingers of the rider of the motorcycle, and operates to substantially improve the comfort of the rider, especially during long periods of extended operation.

Additionally, as can be seen clearly in FIG. 5, the lever 14 and base 12 are joined together in a region 66 with both pieces having substantially matching recessed areas 68, 70 so that when joined together they form a substantially smooth and contiguous surface on the top and bottom surfaces thereof. Additionally, the dial 36 is also located in a recessed region 69 of the lever 14 (see FIG. 1) so that its outer surface is also relatively smooth and contiguous with the top surface of the lever 14 and base 12. Moreover, a nut and bolt arrangement located at the pivot point 26 is recessed into the base 12 on the top surface thereof, and the corresponding bore in the lever 14 is threaded to form a substantially flush bottom surface of the lever 14. The overall effect on the mechanism 10 is to produce smooth and contiguous surfaces that are not only aesthetically pleasing, but are useful in that they reduce the possibility of inadvertently snagging clothes are other items thereon.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A control lever, comprising:
    a base;
    a lever pivotally coupled to said base; and
    an adjustment mechanism for controllably positioning said lever relative to said base, said adjustment mechanism including:
        a cylinder rotatable about a longitudinal axis and coupled to one of said base and said lever and having a first and second bore hole extending radially therein for first and second preselected distances, respectively, and
        a pin coupled to the other of said base and said lever and being substantially perpendicular to the longitudinal axis of said cylinder and alternately engageable with said first and second bore holes.

2. A control lever, as set forth in claim 1, including a spring extending between said lever and said base and urging said lever in a first direction toward a first operating position.

3. A control lever, as set forth in claim 2, wherein said spring is a coil spring.

4. A control lever, as set forth in claim 2, wherein said pin is disengaged from said cylinder in response to said lever being moved in a second direction opposite to said first direction.

5. A control lever, as set forth in claim 1, including a dial coupled to said cylinder, said dial being at least partially exposed for thumb operated rotation in response to said pin being disengaged from said first and second bore holes.

6. A control lever, as set forth in claim 5, wherein said dial has a top surface, and said lever has a top surface substantially planarly arranged with said dial top surface.

7. A control lever, as set forth in claim 1, including a padded strip located on a hand receiving portion of said lever.

8. A control lever, as set forth in claim 7, wherein said padded strip is formed at least partially from rubber.

9. A control lever, as set forth in claim 7, wherein said padded strip is formed at least partially from ethylene propylene diene terpolymers.

10. A control lever, comprising:
    a base;
    a lever pivotally coupled to said base;
    a spring extending between said base and said lever and urging said lever in a first direction toward a first operating position; and
    an adjustment mechanism extending between said base and said lever for controllably positioning said lever relative to said base, said adjustment mechanism being disengaged and free for adjustment in response to movement of said lever in a second direction opposite to said first direction, said adjustment mechanism comprising:
        a cylinder rotatable about a longitudinal axis and coupled to one of said base and said lever and having a first and second bore hole extending axially therein for first and second preselected distances, respectively, and
        a pin coupled to the other of said base and said lever and being substantially perpendicular to the longitudinal axis of said cylinder and alternately engageable with said first and second bore holes.

11. A control lever, as set forth in claim 10, wherein said spring is a coil spring.

12. A control lever, as set forth in claim 10, including a dial coupled to said cylinder, said dial being at least partially exposed for thumb operated rotation in response to said pin being disengaged from said first and second bore holes.

13. A control lever, as set forth in claim 12, wherein said dial has a top surface, and said lever has a top surface substantially planarly arranged with said dial top surface.

14. A control lever, as set forth in claim 10, including a padded strip located on a hand receiving portion of said lever.

15. A control lever, as set forth in claim 14, wherein said padded strip is formed at least partially from rubber.

16. A control lever, as set forth in claim 14, wherein said padded strip is formed at least partially from ethylene propylene diene terpolymers.

17. A brake lever positionable relative to a handlebar of a motorcycle, the brake lever comprising:
    a base adapted to be pivotally coupled to a master cylinder coupled to said handlebar;
    a lever pivotally coupled to said base; and
    an adjustment mechanism for controllably positioning said lever relative to said base to control spacing between said lever and said handlebar, said adjustment mechanism including:
        a cylinder rotatable about a longitudinal axis and coupled to one of said base and said lever and having a first and a second bore hole extending radially therein for first and second preselected distances, respectively, and
        a pin coupled to the other of said base and said lever and being substantially perpendicular to the longitudinal axis of said cylinder and alternately engageable with said first and second bore holes.

* * * * *